United States Patent [19]
Lippert et al.

[11] Patent Number: 5,891,989
[45] Date of Patent: Apr. 6, 1999

[54] CARBON MONOXIDE/OLEFIN-COPOLYMERS

[75] Inventors: Ferdinand Lippert, Bad Dürkheim; Arthur Höhn, Kirchheim; Peter Hofmann, Nürnberg, all of Germany

[73] Assignee: BASF Aktiengesellschaft, Ludwigshafen, Germany

[21] Appl. No.: 952,203

[22] PCT Filed: May 9, 1996

[86] PCT No.: PCT/EP96/01974

§ 371 Date: Nov. 6, 1997

§ 102(e) Date: Nov. 6, 1997

[87] PCT Pub. No.: WO96/37537

PCT Pub. Date: Nov. 28, 1996

[30] Foreign Application Priority Data

May 22, 1995 [DE] Germany ................ 195 18 737.7

[51] Int. Cl.[6] .................................................. C08G 67/02
[52] U.S. Cl. .................... 528/392; 524/115; 524/129; 524/183; 524/709; 502/162
[58] Field of Search ................... 528/392; 524/115, 524/129, 183, 709; 502/162

[56] References Cited

U.S. PATENT DOCUMENTS

| | | | |
|---|---|---|---|
| 4,880,902 | 11/1989 | van Doorn et al. | 528/392 |
| 4,960,747 | 10/1990 | van Doorn et al. | 502/167 |
| 5,338,825 | 8/1994 | Bradford et al. | 528/392 |
| 5,352,767 | 10/1994 | Chien | 528/392 |

FOREIGN PATENT DOCUMENTS

| | | |
|---|---|---|
| 121 965 | 10/1984 | European Pat. Off. . |
| 305 012 | 3/1989 | European Pat. Off. . |
| 369 528 | 5/1990 | European Pat. Off. . |
| 372 602 | 6/1990 | European Pat. Off. . |
| 43 24 773 | 1/1995 | Germany . |

OTHER PUBLICATIONS

Jourl. Org. Chem. 417 (1991) 235–251.
Copolymerization of Carbon Monoxide with Olefins, Sen, Dept. Chem, Penn. State Univ. 126–143.

Primary Examiner—Samuel A. Acquah
Attorney, Agent, or Firm—Keil & Weinkauf

[57] ABSTRACT

Copolymers of carbon monoxide and olefinically unsaturated compounds are obtainable by polymerization of the monomers in the presence of a metal complex of the formula (I)

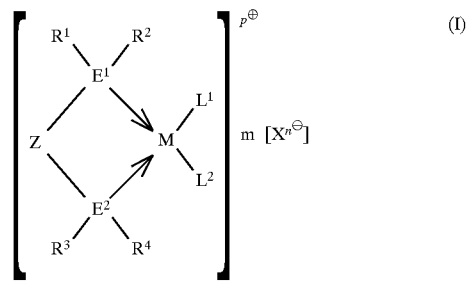

where the substituents and indices have the following meanings:

M is a metal from group VIIIB of the Periodic Table of the Elements, $E^1$, $E^2$ are each an element from group VA of the Periodic Table of the Elements, Z is a structural unit having a bridging atom selected from among the elements of groups IVA, VA and VIA of the Periodic Table of the Elements, $R^1$ to $R^4$ are substituents selected from the group consisting of $C_1$–$C_{20}$-organic and $C_3$–$C_{30}$-organosilicon radicals, where at least one of the four radicals is a nonaromatic radical, $L^1$, $L^2$ are formally charged or uncharged ligands X are formally monovalent or polyvalent anions p is 0, 1 or 2 m, n are 0, 1 or 2 where p=m×n.

4 Claims, No Drawings

CARBON MONOXIDE/OLEFIN-COPOLYMERS

The present invention relates to copolymers of carbon monoxide and olefinically unsaturated compounds, obtainable by polymerization of the monomers in the presence of a metal complex of the formula (I)

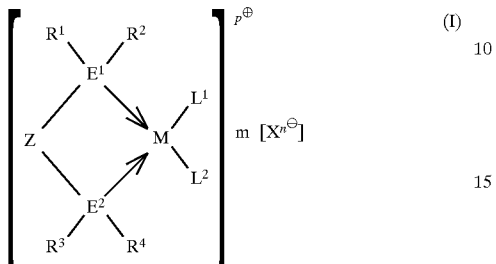

where the substituents and indices have the following meanings:

M is a metal from group VIIIB of the Periodic Table of the Elements, $E^1$, $E^2$ are each an element from group VA of the Periodic Table of the Elements, Z is a structural unit having a bridging atom selected from among the elements of groups IVA, VA and VIA of the Periodic Table of the Elements, $R^1$ to $R^4$ are substituents selected from the group consisting of $C_1$–$C_{20}$-organic and $C_3$–$C_{30}$-organosilicon radicals, where at least one of the four radicals is a nonaromatic radical, $L^1$, $L^2$ are formally charged or uncharged ligands X are formally monovalent or polyvalent anions p is 0, 1 or 2 m, n are 0, 1 or 2 where p=m×n.

The present invention further relates to a process for preparing such copolymers, the use of the copolymers for producing fibers, films and moldings, and also the fibers, films and moldings comprising the copolymers.

Carbon monoxide-olefin copolymers, also known as polyketones, which are built up in an alternating fashion of the structural element of an olefin and carbon monoxide, are known from, for example, Journal of Organometallic Chemistry, 417 (1991) 235, and Adv. Polym. Sci., 73/74 (1986) 125 ff.

The polymers are prepared by reacting the monomers in the presence of a catalyst system composed of a plurality of components.

The components are essentially a transition metal compound of transition group VIII of the Periodic Table of the Elements, phosphine ligands and acids, as described, for example, in EP-A 121 965.

The constituents of the catalyst system are generally mixed with one another before the polymerization or directly in the polymerization reactor by metering in the individual components, thus forming the active catalyst.

However, it is complicated to reproducibly meter in the individual components in optimum ratios. Furthermore, the metering procedure with different metering devices, as well as maintaining stocks of the various catalyst components, is economically disadvantageous.

U.S. Pat. No. 5,338,825 describes a process for preparing carbon monoxide-olefin copolymers using singly positively charged metal complexes which, inter alia, have to have a ligand which stabilizes the complex.

However, the preparative accessibility and the polymerization activity of the catalysts leave something to be desired.

U.S. Pat. No. 5,352,767 describes alternating, elastomeric copolymers of carbon monoxide and α-olefins which were prepared using a catalyst system comprising cationic metal complexes of group VIIIa of the Periodic Table of the Elements and activators.

However, only α-olefins are described as comonomers for preparing such copolymers and the polymerization activity of the catalysts is still in need of improvement.

It is an object of the present invention to provide copolymers of carbon monoxide and olefinically unsaturated compounds which do not have the disadvantages mentioned, or have them to only a subordinate degree. Another object of the present invention is to provide a process for preparing these polymers using a catalyst which consists of as few components as possible and gives the copolymers in good yield.

We have found that this object is achieved by the copolymers defined in the introduction.

Furthermore, we have found a process for preparing the copolymers defined in the introduction, the use of the defined copolymers for producing fibers, films and moldings, and also the fibers, films and moldings comprising the copolymers defined in the introduction.

The copolymers of the present invention are built up of units derived from the monomers carbon monoxide and one or more olefinically unsaturated compounds. The monomers are generally incorporated alternately into the copolymer. Suitable olefinically unsaturated compounds are in principle all monomers of this class of compound.

Preference is given to ethylene and $C_3$–$C_{10}$-alkenes such as 1-butene, 2-butene, 1-pentene, 1-hexene, 1-octene, 1-nonene, 1-decene and particularly propene, also butadiene, as well as cycloolefins such as cyclopentene, cyclohexene, norbornene and norbornadiene and its derivatives.

Among the olefinically unsaturated aromatic monomers, particular mention may be made of styrene and α-methylstyrene.

Also of particular importance are acrylic acid and methacrylic acid and their derivatives, in particular the nitriles, the amides and the $C_1$–$C_6$-alkyl esters such as ethyl acrylate, n-butyl acrylate, tert-butyl acrylate and methyl methacrylate.

Further suitable monomers are vinyl chloride, vinyl acetate, vinyl propionate, maleic anhydride and N-vinylpyrrolidone.

Of course, it is also possible to use mixtures of various monomers; the mixing ratio is generally not critical.

The molar ratio of the olefinically unsaturated compound to the carbon monoxide can largely be selected freely; it is preferably from 0.1:1 to 10:1, particularly preferably in the vicinity of 1:1.

The copolymers of the present invention have a low residual palladium content in the polymer.

The molecular weights Mw (weight average) of the copolymers (measured by means of gel permeation chromatography (GPC) at 25° C. using Shodex® HFIP 803 or 805 as column material and hexafluoroisopropanol as solvent against a polymethyl methacrylate standard) are generally in the range from 1000 to 1,000,000, preferably from 1000 to 100,000.

The molecular weight distribution Mw/Mn (weight average molecular weight/number average molecular weight), measured by means of gel permeation chromatography (GPC) in a similar manner to that described above, of the copolymers of the present invention is generally from 2 to 50, preferably from 2 to 20.

The K value of the copolymers, measured in accordance with DIN 51562 Parts 1 to 3 at 25° C. in hexafluoroisopropanol, is from 20 to 500, preferably from 50 to 400.

The type and number of the end groups, and also the mean molecular weight of the carbon monoxide copolymers was determined by means of $^{13}C$—NMR spectroscopy as described in J. Organometal. Chem. 417 (1991), page 235 ff.

Owing to their numerous functional groups, the carbon monoxide copolymers of the present invention can be modified using customary chemical reactions, as described, for example, in EP-A 372 602, or a combination of both methods.

Suitable metals M in the catalyst complexes of the formula (I) used for preparing the carbon monoxide copolymers of the present invention are the metals of group VIIIB of the Periodic Table of the Elements, viz. iron, cobalt and nickel and especially the platinum metals ruthenium, rhodium, osmium, iridium, platinum and very particularly palladium. In the complexes, the metals can be present in formally uncharged, formally singly positively charged or formally doubly positively charged form.

Suitable elements $E^1$ and $E^2$ of the chelating ligand are the elements of main group V of the Periodic Table of the Elements (group VA), i.e. nitrogen, phosphorus, arsenic, antimony or bismuth.

Particularly suitable elements are nitrogen and phosphorus, in particular phosphorus. The chelating ligand can have different elements $E^1$ and $E^2$, for example nitrogen and phosphorus.

The bridging structural unit Z is a group of atoms which joins the two elements $E^1$ and $E^2$ to one another. An atom from group IVA, VA or VIA of the Periodic Table of the Elements forms the connecting bridge between $E^1$ and $E^2$. Possible free valences of these bridge atoms can be satisfied in various ways, for example by bonding to hydrogen, elements from groups IVA, VA, VIA and VIIA of the Periodic Table of the Elements. These substituents can form ring structures among one another or with the bridging atom.

Particularly suitable bridging structural units are those having only one bridging atom from group IVA of the Periodic Table of the Elements, for example —$CR^5R^6$— or —$SiR^5R^6$—, where $R^5$ and $R^6$ are hydrogen and $C_1$–$C_{10}$-organic radicals. $R^5$ and $R^6$ can also, together with the bridging atom, form a 3- to 10-membered ring. Examples of bridging structural units having a single bridging atom are methylene (—$CH_2$—), ethylidene ($CH_3(H)C=$), 2-propylidene (($CH_3)_2C=$), diphenylmethylene (($C_6H_5)_2C=$), dialkylsilylene such as dimethylsilylene (($CH_3)_2Si=$), diphenylsilylene (($C_6H_5)_2Si=$); also, as cyclic bridges, cyclopropylidene, cyclobutylidene, cyclopentylidene and cyclohexylidene.

Preferred bridging structural units are methylene (—$CH_2$—), ethylidene ($CH_3(H)C=$), 2-propylidene (($CH_3)_2C=$), dimethylsilylene, diphenylsilylene, in particular methylene.

Suitable organic radicals $R^1$ to $R^4$ are aliphatic and also cycloaliphatic and aromatic radicals having from 1 to 20 carbon atoms, for example methyl, ethyl, 1-propyl, 1-butyl, 1-pentyl, 1-hexyl and 1-octyl. Also suitable are linear arylalkyl groups having from 1 to 10 carbon atoms in the alkyl radical and from 6 to 20 carbon atoms in the aryl radical, for example benzyl, and also aryl radicals such as phenyl, tolyl and other substituted phenyl groups; at least one of the four radicals $R^1$ to $R^4$ is a nonaromatic radical.

The radicals $R^1$ to $R^4$ should preferably be sufficiently bulky to substantially screen the central atom, e.g. the palladium atom, with which the atoms $E^1$ and $E^2$ form the active complex. Radicals which meet this requirement are, for example, cycloaliphatic radicals and also branched aliphatic radicals, particularly those which are branched in the α position.

Suitable cycloaliphatic radicals are $C_3$–$C_{10}$-monocyclic radicals such as cyclopropyl, cyclobutyl, cyclopentyl, cyclohexyl and menthyl, and also bicyclic radicals such as norbornyl, pinanyl, bornyl and bicyclononyl. The ring framework of these groups may be linked in any way to the atoms $E^1$ and $E^2$. The cycloaliphatic radicals preferably contain a total of from 5 to 20 carbon atoms, very particular preference is given to cyclohexyl and menthyl.

Suitable branched aliphatic radicals are $C_3$–$C_{20}$-alkyl, preferably $C_3$–$C_{12}$-alkyl, radicals such as isopropyl, isobutyl, sec-butyl, neopentyl and tert-butyl; also alkylaryl having from 1 to 10 carbon atoms in the alkyl radical and from 6 to 20 carbon atoms in the aryl radical.

Particularly useful branched aliphatic radicals are tert-butyl, isopropyl and sec-butyl.

Alkyl groups having branching located further out are also well suited as substituents $R^1$ to $R^4$. Examples are the isobutyl, 3-methylbut-2-yl and 4-methylpentyl groups.

On the basis of observations up to now, the chemical nature of the radicals $R^1$ to $R^4$ is not of decisive importance, i.e. the radicals can also comprise atoms from groups IVA, VA, VIA and VIIA of the Periodic Table of the Elements, for example halogen, oxygen, sulfur, nitrogen and silicon; in the latter case for example the bis(trimethylsilyl)methyl group. Functional groups such as hydroxy, alkoxy and cyano which are inert under the polymerization conditions are also possibilities in this context.

Preferred heterosubstituents $R^1$ to $R^4$ are $C_3$–$C_{30}$-organosilicon radicals, i.e. tetravalent silicon atoms which are bound to $E^1$ or $E^2$ and whose remaining valences are occupied by three organic radicals, where the total number of carbon atoms in these three radicals bound to silicon is in the range from three to thirty. Examples which may be mentioned are the trimethylsilyl, tert-butyldimethylsilyl and triphenylsilyl groups, in particular the trimethylsilyl group.

Preference is given to using methylene-bridged diphosphines as chelating ligands, for example
[(di-tert-butylphosphino)(diphenylphosphino)]methane; particular preference is given to using diphosphines having methylene bridges substituted by $C_3$–$C_{10}$-cycloaliphatic or branched $C_3$–$C_{20}$-aliphatic radicals $R^1$ to $R^4$, for example bis(di-tert-butylphosphino)methane,
[(di-tert-butylphosphino)(dicyclohexylphosphino)]methane, bis(dicyclohexylphosphino)methane or
[(di-tert-butylphosphino)(dimenthylphosphino)]methane whose good suitability for the process of the present invention is at present attributed to the methylene linkage of the two phosphorus atoms and the very bulky structure of the radicals $R^1$ to $R^4$.

Very particularly preferred chelating ligands are bis(di-tert-butylphosphino)methane,
[(di-tert-butylphosphino)(dicyclohexylphosphino)]methane, bis(dicyclohexylphosphino)methane,
[(di-tert-butylphosphino)(diphenylphosphino)]methane and [(di-tert-butylphosphino)(dimenthylphosphino)]methane.

Depending on the formal oxidation state of the central metal M, the ligands $L^1$, $L^2$ bear one or two formal negative charges, or else, if the metal is formally uncharged the ligands $L^1$, $L^2$ are likewise formally uncharged.

The chemical nature of the ligands is not critical. On the basis of the present state of knowledge, they have the function of stabilizing the remainder of the metal complex against decomposition, for example precipitation of the metal or unspecified reactions such as aggregation of the fragments of the complex.

Suitable formally charged inorganic ligands $L^1$, $L^2$ are hydride, halides, sulfates, phosphates or nitrate.

Preference is given to using halides such as chloride, bromide and iodide, in particular chloride.

Suitable formally charged organic ligands $L^1$, $L^2$ are $C_1$–$C_{20}$-aliphatic groups, $C_3$–$C_{30}$-cycloaliphatic groups, $C_7$–$C_{20}$-aralkyl groups having from 6 to 10 carbon atoms in the aryl part and from 1 to 10 carbon atoms in the alkyl part, and $C_6$–$C_{20}$-aromatic groups, for example methyl, ethyl propyl, iso-propyl, tert-butyl, neo-pentyl, cyclohexyl, benzyl, neophyl, phenyl and aliphatically or aromatically substituted phenyl groups.

Further suitable formally charged organic ligands $L^1$, $L^2$ are $C_1$–$C_{20}$-carboxylates such as acetate, propionate, oxalate, benzoate and citrate and also salts of organic sulfonic acids such as methylsulfonate, trifluoromethylsulfonate and p-toluenesulfonate. Preference is given to using $C_1$–$C_7$-carboxylates, sulfonic acid derivatives and in particular acetate and p-toluenesulfonate.

Suitable formally uncharged ligands $L^1$, $L^2$ are Lewis bases in general, i.e. compounds having a free electron pair. Particularly well suited Lewis bases are those whose free electron pair or pairs is/are located on a nitrogen or oxygen atom, for example nitriles, R—CN, ketones, ethers and alcohols. Preference is given to using $C_1$–$C_{10}$-nitriles such as acetonitrile, propionitrile, or benzonitrile, or $C_2$–$C_{10}$-ketones such as acetone or acetylacetone or else $C_2$–$C_{10}$-ethers such as dimethyl ether, diethyl ether or tetrahydrofuran. Particular preference is given to using acetonitrile or tetrahydrofuran.

Depending on the formal charge of the complex fragment containing the metal M, the metal complex (I) contains anions X. However, if the M-containing complex fragment is formally uncharged, the complex of the present invention contains no anion X.

The chemical nature of the anions X is not critical. However, on the basis of the present state of knowledge, it is advantageous if they have as little nucleophilicity as possible, i.e. have a very low tendency to form a chemical bond with the central metal M.

Suitable anions X are, for example, perchlorate, sulfate, phosphate, nitrate and carboxylates such as acetate, trifluoroacetate, trichloroacetate, propionate, oxalate, citrate and benzoate, also conjugated anions of organosulfonic acids, e.g. methylsulfonate, trifluoromethylsulfonate and para-toluenesulfonate, in addition tetrafluoroborate, tetraphenylborate, tetrakis(pentafluorophenyl)borate, hexafluorophosphate, hexafluoroarsenate or hexafluoroantimonate. Preference is given to using perchlorate, trifluoroacetate, sulfonates such as methylsulfonate, trifluoromethylsulfonate, p-toluenesulfonate, tetrafluoroborate or hexafluorophosphate, in particular trifluoroacetate, perchlorate or p-toluenesulfonate.

The uncharged chelate complexes of the formula (I) are generally prepared by replacement of weakly coordinating ligands, for example 1,5-cyclooctadiene, benzonitrile or tetramethylethylenediamine, which are bound to the appropriate transition metal compounds, for example transition metal halides, transition metal (alkyl) (halides), transition metal diorganyls, by the chelating ligands $[R^1R^2E^1]$—Z—$[R^3R^4E^2]$ of the present invention as set forth in any of claims 1 to 5. The reaction is generally carried out in a solvent, for example dichloromethane, at from −78° to 40° C.

A further suitable synthetic method is the reaction of the chelate complexes of the formula (I) with organometallic compounds of groups IA, IIA, IVA and IIB, for example $C_1$–$C_6$-alkyls of the metals lithium, aluminum, magnesium, zinc, with formally charged inorganic ligands $L^1$, $L^2$ as defined above being replaced by formally charged aliphatic, cycloaliphatic or aromatic ligands $L^1$, $L^2$ as likewise defined above. The reaction is generally carried out in a solvent, for example diethyl ether or tetrahydrofuran, at from −78° to 65° C.

Monocationic complexes of the formula (I) are formed by reacting (chelating ligand)metal(halo)(organo) complexes of the formula (I) in which $L^1$ is halogen and $L^2$ is one of the above-defined formally charged organic ligands (except for the anions of organic acids) with metal salts M'X. The reaction is generally carried out in coordinating solvents such as acetonitrile or tetrahydrofuran at from −78° to 65° C.

It is advantageous if the metal salts M'X meet the following criteria. The metal M' should preferably form sparingly soluble metal chlorides, for example silver. The salt anion should preferably be a non-nucleophilic anion X, as defined above.

Well suited salts for forming cationic complexes are silver tetrafluoroborate, silver hexafluorophosphate, silver trifluoromethanesulfonate, silver perchloroate and silver para-toluenesulfonate.

The dicationic complexes (II) are prepared by a method similar to that for the monocationic complexes, except that now the (chelating ligand)metal(dihalo) complexes of the formula (I) ($L^1$ and $L^2$ are halogen) are now used as precursor in place of the (chelating ligand)metal(halo) (organo) complexes.

A further possible method of preparing the dicationic complexes (I) is reacting $[Y_4M]X_2$ with the chelating ligands $[R^1R^2E^1]$—Z—$[R^3R^4E^2]$ defined in the introduction. Here, Y are identical or different weak ligands such as acetonitrile, benzonitrile or 1,5-cyclooctadiene, M and X are as defined above.

A preferred method of preparing the metal complexes of the formula (I) is reacting the dihalometal precursor complexes with silver salts having noncoordinating anions.

The polymerizations for preparing the carbon monoxide copolymers of the present invention can be carried out either batchwise or continuously.

Pressures of from 100 to 500,000 kPa, preferably from 200 to 350,000 kPa and in particular from 500 to 30,000 kPa, and temperatures of from −50 to 400° C., preferably from 20 to 250° C. and in particular from 40 to 150° C., have been found to be useful.

Polymerization reactions using the metal complexes (I) defined in the introduction can be carried out in the gas phase, in suspension, in liquid and in supercritical monomers and in solvents which are inert under the polymerization conditions.

Suitable inert solvents are alcohols such as methanol, ethanol, propanol, i-propanol, 1-butanol and tert-butanol, sulfoxides and sulfones, for example dimethyl sulfoxide, esters such as ethyl acetate and butyrolactone, ethers such as tetrahydrofuran, dimethylethylene glycol and diisopropyl ether and also aromatic solvents such as benzene, toluene, ethylbenzene or chlorobenzene or mixtures thereof.

The molecular weight of the polymers of the present invention can be influenced in a manner known to those skilled in the art by varying the polymerization temperature, by means of protic compounds such as alcohols, for example methanol, ethanol, tert-butanol, preferably methanol, and by addition of hydrogen. In general, a high concentration of regulating substances and/or a high polymerization temperature gives a relatively low molecular weight and vice versa.

The polymers prepared using the process of the present invention generally have a low palladium content and a narrow molecular weight distribution Mw/Mn.

EXAMPLES

Abbreviations bcpm [(di-tert-butylphosphino)(dicyclohexylphosphino)] methane dtbpm bis(di-tert-butylphosphino)methane tbppm [(di-tert-butylphosphino)(diphenylphosphino)] methane dchpm bis(dicyclohexylphosphino)methane MeCN acetonitrile, $CH_3$—CN General polymerization conditions A 0.3 l autoclave was charged with 100 ml of methanol and the appropriate palladium compound. Subsequently, at the reaction temperature selected, a mixture of ethylene and carbon monoxide in a molar ratio of 1:1 was injected until the desired total pressure was reached. Polymerization was carried out for 5 hours. The temperature and the partial pressures of the monomers were kept constant during the entire reaction time. The polymerization was stopped by reducing the pressure to ambient pressure, the reaction mixture was filtered and the residue was dried. The experimental parameters are shown in Table 1, the polymerization properties in Table 2.

TABLE 1

Experimental parameters

| No. | Complex, mg, mmol | Pressure [kPa] | Temp. [°C.] | Yield [g] |
|---|---|---|---|---|
| 1 | [(dtbpm)Pd(MeCN)$_2$](p-Tos)$_2$, 33, 0.05 | 20,000 | 80 | 22.0 |
| 2 | [(tbppm)Pd(MeCN)$_2$](CF$_3$SO$_3$)$_2$, 18, 0.03 | 20,000 | 50 | 50.2 |
| 3 | [(dchpm)Pd(MeCN)$_2$](ClO$_4$)$_2$, 40, 0.05 | 20,000 | 50 | 41.3 |
| 4 | [(bcpm)Pd(MeCN)$_2$](ClO$_4$), 19, 0.03 | 20,000 | 50 | 65.3 |
| 5 | [(tbppm)Pd(CH$_3$)(MeCN)](ClO$_4$), 15, 0.03 | 20,000 | 50 | 2.1 |
| 6 | [(tbppm)PdCl$_2$], 52, 0.1 | 20,000 | 50 | 2.1 |
| 7 | [(bcpm)Pd(MeCN)$_2$](CF$_3$SO$_3$)$_2$, 60, 0.07 | 6000 | 85 | 40.1 |

TABLE 2

Polymer properties

| No. | Melting point [°C.] | K value |
|---|---|---|
| 1 | 236 | 87 |
| 2 | 258 | >300 |
| 3 | 260 | >300 |
| 4 | 238 | 198 |
| 5 | 261 | 182 |
| 6 | 255 | 57 |
| 7 | 238 | 76 |

We claim:

1. A process for preparing a copolymer of carbon monoxide and at least one olefinically unsaturated monomer which consists essentially of: Polymerizing carbon monoxide and the at least one olefinically unsaturated monomer in the presence of a defined metal complex, which has been prepared and isolated in advance, of the formula (I)

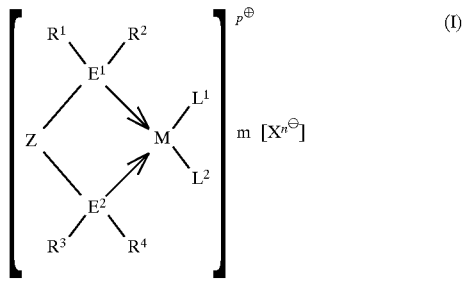

where the substituents and indices have the following meanings:

M is a metal from group VIIIB of the Periodic Table of the Elements, $E^1$, $E^2$ are each an element from group VA of the Periodic Table of the Elements, Z is a structural unit having a bridging atom selected from among the elements of groups IVA, VA and VIA of the Periodic Table of the Elements, $R^1$ to $R^4$ are substituents selected from the group consisting of $C_1$–$C_{20}$-organic and $C_3$–$C_{30}$-organosilicon radicals, where at least one of the four radicals is a branched aliphatic or cycloaliphatic radical having from 1 to 20 carbon atoms, $L^1$, $L^2$ are formally charged or uncharged ligands X are formally monovalent or polyvalent anions p is 0, 1 or 2 m, n are 0, 1 or 2 where p=m×n.

2. The process defined in claim 1, wherein the olefinically unsaturated compounds used are olefins, diolefins or olefins substituted by functional groups, or else vinylaromatics.

3. The process defined in claim 1, wherein the olefinically unsaturated compounds used are $C_2$–$C_{20}$-alk-1-enes, internal $C_4$–$C_{20}$-alkene, $C_4$–$C_{20}$-diolefins or α, β-unsaturated carboxylic acids or their derivatives.

4. A film, fiber or molding found from the copolymer defined in claim 1.

* * * * *